(12) United States Patent
Kim

(10) Patent No.: US 7,853,246 B2
(45) Date of Patent: Dec. 14, 2010

(54) METHOD FOR EXECUTING MENU IN MOBILE COMMUNICATION TERMINAL AND MOBILE COMMUNICATION TERMINAL USING THE SAME

(75) Inventor: Hak Soo Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 1184 days.

(21) Appl. No.: 11/486,094

(22) Filed: Jul. 14, 2006

(65) Prior Publication Data
US 2007/0155373 A1     Jul. 5, 2007

(30) Foreign Application Priority Data
Dec. 29, 2005    (KR) .................. 10-2005-0132831

(51) Int. Cl.
*H04M 3/00*    (2006.01)
(52) U.S. Cl. ........................... 455/418
(58) Field of Classification Search ............ 455/418, 455/419, 420, 550.1, 410, 508, 41.2, 507, 455/90, 575.1, 566, 414.1, 552.1, 230, 9, 455/16, 186.1, 186.2
See application file for complete search history.

(56) References Cited
U.S. PATENT DOCUMENTS
6,122,530 A *   9/2000   Overy et al. ............. 455/566
7,596,374 B2 *  9/2009   Katou ........................ 455/425
2003/0044000 A1*  3/2003   Kfoury et al. ............ 379/433.04

FOREIGN PATENT DOCUMENTS
CN     1282186 A    1/2001
JP     2002-091680 A    3/2002

* cited by examiner

*Primary Examiner*—Melody Mehrpour
(74) *Attorney, Agent, or Firm*—Birch, Stewart, Kolasch & Birch, LLP

(57) ABSTRACT

A method for executing a menu in a mobile communication terminal. The method includes identifying a particular key among a plurality of keys, identifying a location of the particular key, and assigning a first menu function and at least a second menu function to the particular key based on a combination of the identification and the location of the particular key.

26 Claims, 10 Drawing Sheets

METHOD FOR EXECUTING MENU IN MOBILE COMMUNICATION TERMINAL AND MOBILE COMMUNICATION TERMINAL USING THE SAME

This application claims priority to Korean Patent Application No. 10-2005-0132831 filed on Dec. 29, 2005 in Korea, the entire contents of which is hereby incorporated by reference in its entirety.

BACKGROUND OF THE INVENTION

1. Field of the Invention

The present invention relates to executing a menu in a mobile communication terminal.

2. Description of the Related Art

Mobile communication terminals provide data transmission and other functions in addition to voice communication capabilities. Thus, the mobile terminal provides a graphic user interface including a plurality of different menu options the user can select to perform the various functions.

For example, a main menu may be selected to thereby display sub menus. The sub menus include numbers, for example, that can be selected on the keypad of the terminal to thereby perform the corresponding function. However, this process is inconvenient to the user because he or she has to navigate through the different menus to perform a desired function. In addition, because the menu options are sequentially arranged step by step, the user has to navigate through the menus step by step.

Further, the terminal provides some hot keys that may be selected to perform a specific function. For example, a menu key may be provided that allows the user to display the different menu options. However, the function of the hot keys is preset by a manufacturer of the terminal, and can not be changed by the user. Therefore, the user is limited to only using hot keys previously set by the manufacturer.

SUMMARY OF THE INVENTION

Accordingly, one object of the present invention is to address the above-noted and other objects.

Another object of the present invention is to allow the user to set a desired menu option to a particular key on the terminal such as a hot key.

To achieve these and another objects, the present invention provides in one aspect a method for executing a menu in a mobile communication terminal. The method includes identifying a particular key among a plurality of keys, identifying a location of the particular key, and assigning a first menu function and at least a second menu function to the particular key based on a combination of the identification and the location of the particular key. The present invention also provides a corresponding communication terminal.

In another aspect the present invention provides a method for executing a menu in a mobile communication terminal. The method includes identifying a particular key among a plurality of keys, identifying a number of times a selection key has been selected, and assigning a first menu function and at least a second menu function to the particular key based on a combination of the identification and the number of times the selection key has been selected. The present invention also provides a corresponding mobile communication terminal.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The above and other objects, features and advantages of the present invention will become apparent from the following description of preferred embodiments given in conjunction with the accompanying drawings, in which.

DETAILED DESCRIPTION OF THE INVENTION

Reference will now be made in detail to the preferred embodiments of the present invention, examples of which are illustrated in the accompanying drawings.

Figure 1:
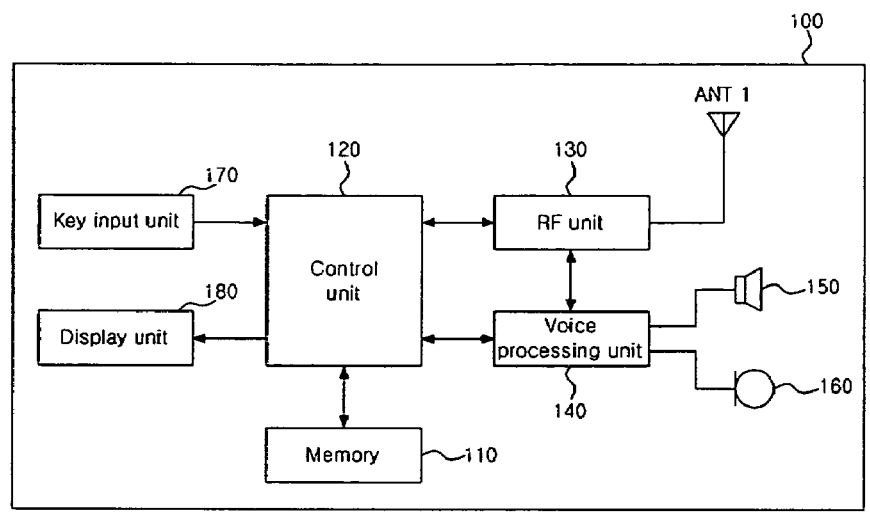
FIG. 1 is a block diagram illustrating a mobile communication terminal for executing a menu according to an embodiment of the present invention.

Turning first to FIG. 1, which is a block diagram illustrating a mobile terminal 100 that performs a method for executing a menu according to an embodiment of the present invention. As shown, the mobile terminal 100 includes a memory 110 for storing a variety of information including menus assigned to function keys and key data related to the assignment of the menus to the function keys, a control unit 120 for controlling operations of the mobile terminal 100, a radio frequency (RF) unit 130 for performing radio signal processing with a communication network, a voice processing unit 140, a speaker 150, a microphone 160, a key input unit 170, and a display unit 180 for displaying information to the user. In the below description, a hot key is a key that can immediately perform a desired function when selected.

In one embodiment, the function keys are formed on a rotary keypad including four buttons. The rotary key may also be rotated in any direction. In addition, each function key is assigned a "first key data" which identifies the particular key (e.g., a left, right, up or down button). Because these keys can be rotated to different positions, a "second key data" is used to identify the position of the key. In another example, the second key data is used to identify the number of times a particular key is selected. The control unit 120 then uses the first and second key data to determine the function to execute based on the selection/rotation of the hot key. These features are discussed in more detail below.

In addition, the memory 110 stores an operating program of the control unit 120 and also a system program for operating the terminal 100 in a Read Only Memory (ROM), Electrically erasable ROMs (EEPROMs), flash memories, etc. The memory 110 aslo includes a Random Access Memory (RAM) for temporarily storing data. Further, the memory 110 also stores the first and second key data, and execution information related to a selected function key. Accordingly, the control unit 120 can use the stored data to immediately execute a function associated with a hot key.

Further, the control unit 120 displays execution information set for each function key on the rotated rotary keypad. Accordingly, the user can easily select a desired menu while rotating the rotary keypad in any direction while referring to the execution information. Also, under the control of the control unit 120, the RF unit 130 converts a signal output from control unit 120 into a radio frequency signal. The RF unit 130 also converts a radio frequency signal received from the antenna ANT 1 into a desired signal and outputs the signal.

The voice processing unit 140 modulates a voice signal input from the microphone 160 into voice data, demodulates voice data input from the RF unit 130 and voice data stored in the memory 110 into voice signals, and outputs the voice signals through the speaker 150. In addition, the key input unit 170 includes a plurality of numeral keys, menu keys and function keys allowing the user to perform a variety of different functions. The key input unit 170 also includes the rotary keypad and a fixed keypad including a dial key, a call key, an end key, a cancel key, etc.

Further, the display unit 180 includes, for example, a liquid display device (LCD), and displays information related to the execution of the mobile terminal 100 under control of the control unit 120. That is, the display unit 180 displays the general status of the mobile communication terminal, user information to be input, etc.

Figure 2:
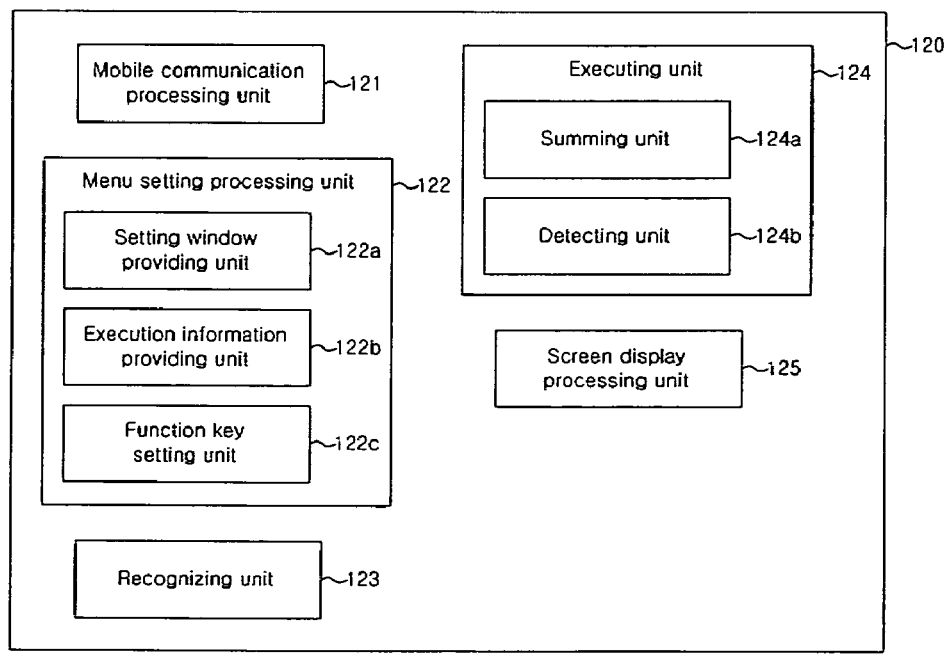
FIG. 2 is a block diagram illustrating a control unit of the mobile terminal shown in FIG. 1.

Turning next to FIG. 2, which is a block diagram of the control unit 120. As shown, the control unit 120 includes a mobile communication processing unit 121, a menu setting processing unit 122, a recognizing unit 123, an executing unit 124, and a screen display processing unit 125. The mobile communication processing unit 121 is a module for performing mobile communication services using radio resources in the mobile communication terminal. Because the mobile communication processing unit 121 is configured and operated using a known mobile communication technique, a detailed description thereof will be omitted.

Further, the menu setting processing unit 122 sets the execution information in each function key on the rotary keypad, and stores the set execution information in the memory 110. More specifically, the menu setting processing unit 122 includes a setting window providing unit 122a, an execution information providing unit 122b, and a function key setting unit 122c. Also, the first and second key data are added or summed together and the result is used to identify the selected hot key.

When the user requests execution information be set for a function key on the rotary keypad, the setting window providing unit 122a provides a setting window allowing the user to set a desired function. Further, the execution information providing unit 122b provides execution information that has not been set in the function keys on the rotary keypad. Accordingly, the user cannot doubly set execution information in each function key.

In addition, when the user selects one piece of execution information provided by the execution information providing unit 122b, the function key setting unit 122c sets the selected execution information for the function key. Further, when the user selects a function key on the rotary keypad, the recognizing unit 123 recognizes key data and position data of the selected function key. The executing unit 124 sums the first and second key data recognized by the recognizing unit 123, detects execution information to be executed according to the summed data, and executes a relevant menu according to the detected execution information.

More specifically, the executing unit 124 includes a summing unit 124a and a detecting unit 124b. The summing unit 124a sums the first and second key data of the function key, and the detecting unit 124b detects from the memory 110 execution information to be executed according to the summed data from the summing unit 124a. In addition, because the execution information is stored in the memory 110 in correspondence with the summed data, a relevant menu can be immediately executed irrespective of the position of the selected function key.

Also, the screen display processing unit 125 displays the preset setting information for each set function on the rotary keypad. Further, the execution information of each function key to be executed at a rotated position is displayed with the same color, so that the user can immediately execute a desired menu by simply rotating the function key to a relevant position while referring to the setting information displayed on the screen. Thus, the user can quickly execute the menu of the function key.

Figure 3:
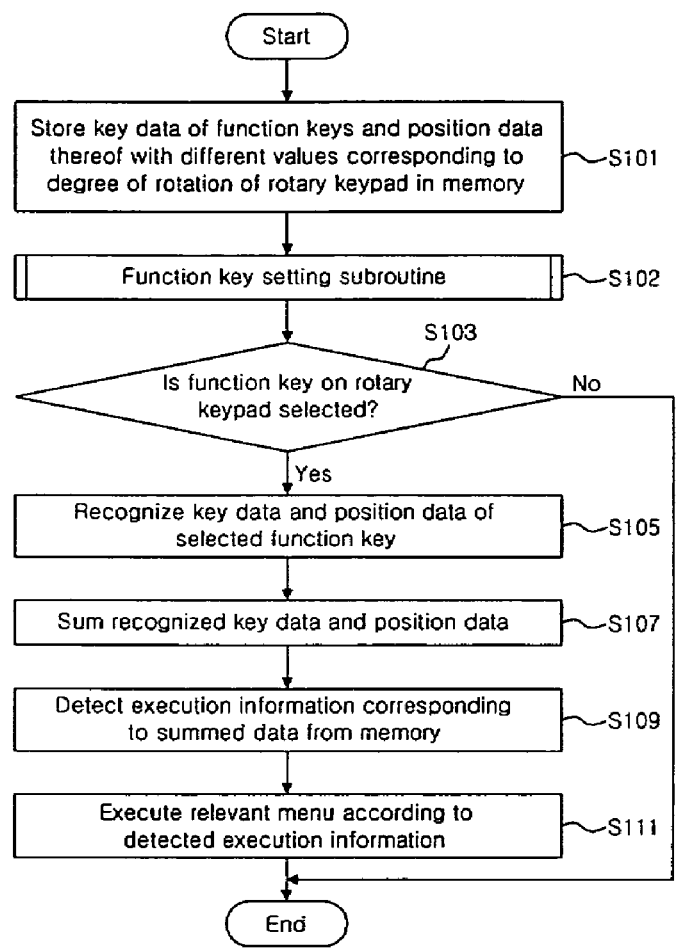
FIG. 3 is a flowchart illustrating a method for executing a menu in a mobile terminal according to an embodiment of the present invention.

Next, FIG. 3 is a flowchart illustrating a method for executing a menu in a mobile terminal according to an embodiment of the present invention. FIGS. 1 and 2 will also be referred to in this description. As shown in FIG. 3, the control unit 120 stores the first and second key data of each function key on the rotary keypad in the memory 110 (S101). Further, the menu setting processing unit 122 performs a function key setting subroutine to set at least a piece of execution information for activating each of the function keys on the rotary keypad (S102). This subroutine will be described in more detail with respect to FIG. 4.

Then, the recognizing unit 123 determines whether the user selects a function key on the rotary keypad (S103). As mentioned above, the rotary keypad can be freely rotated clockwise or counterclockwise. If the recognizing unit 123 determines the user did not select a function key on the rotary keypad (No in S103), the recognizing unit 123 remains in an idle state for a predetermined period of time and then terminates the process.

However, if the recognizing unit 123 determines the user has selected a function key on the rotary keypad (Yes in S103), the recognizing unit 123 recognizes the appropriate first and second key data for the selected function key (S105). The summing unit 124a then sums the first and second key data (S107), and the detecting unit 124b then detects execution information, which has been stored in correspondence with the summed data from the memory 110 (S109). Further, the executing unit 124 then executes a relevant menu according to the detected execution information (S111). Thus, the user can quickly execute a relevant menu by rotating and selecting a function key he or she previously set.

Figure 4:
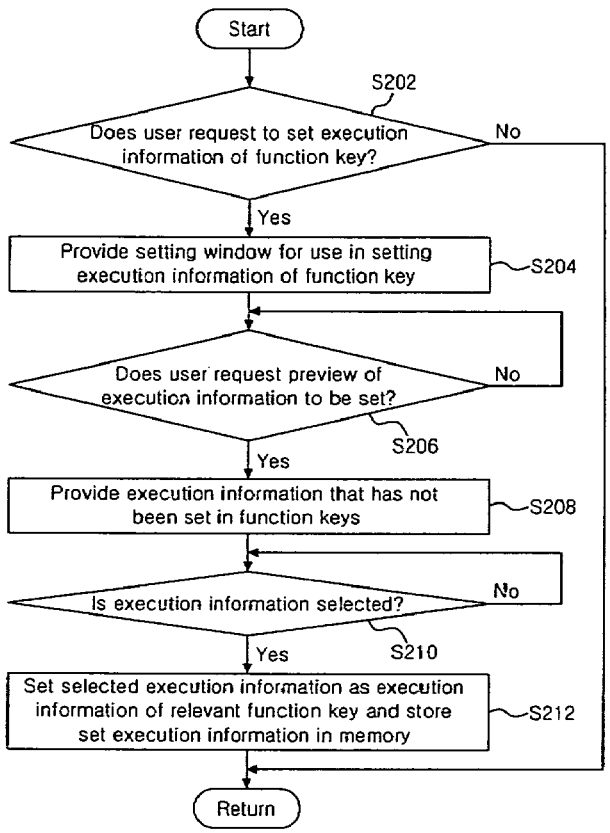
FIG. 4 is a flowchart illustrating a function key setting subroutine of FIG. 3.

The function key setting subroutine in step S102 will be now described with reference to FIG. 4. In more detail, the menu setting processing unit 122 determines whether or not a user has requested the setting of execution information for a function key (S202). If the menu setting processing unit 122 determines the user did not request the setting (No in S202), step S103 in FIG. 3 is executed. Alternatively, if the menu setting processing unit 122 determines the user has requested the setting (Yes in S202), the setting window providing unit 122a provides a setting window that the user can use to set the execution information of the function key (S204). For example, the setting window includes a portion including basic execution information set in a function key (e.g., the up key), and execution information to be executed depending on rotation of remaining function keys (e.g., left key, right key, and down key).

Then, the menu setting processing unit 122 determines whether or not the user requests a preview of setting information (S206). If the setting processing unit 122 determines the user did not request a preview (No in S206), the menu setting processing unit 122 remains in an idle state for a predetermined period of time. However, if the setting processing unit 122 determines the user did request a preview (Yes in S206), the execution information providing unit 122b provides a list of execution information that has not been set in the function keys on the rotary keypad (S208).

The menu setting processing unit 122 then determines whether or not the user selects execution information from the provided list (S210). If the processing unit 122 determines the user did not select execution information (No in S210), the menu setting processing unit 122 remains in an idle state for a predetermined period of time. Alternatively, if the menu setting processing unit 122 determines the user has selected execution information (Yes in S210), the function key setting unit 122c sets the selected execution information as execution information of a relevant function key and stores the set execution information in the memory 110.

That is, the function key setting unit 122c stores summed data for execution of the selected execution information in the memory 110 such that the data correspond to the selected execution information. As will be described in more detail later, the summed data is data obtained by summing the first key data identifying a particular key and the second key data identifying a position of the key.

Figure 5:
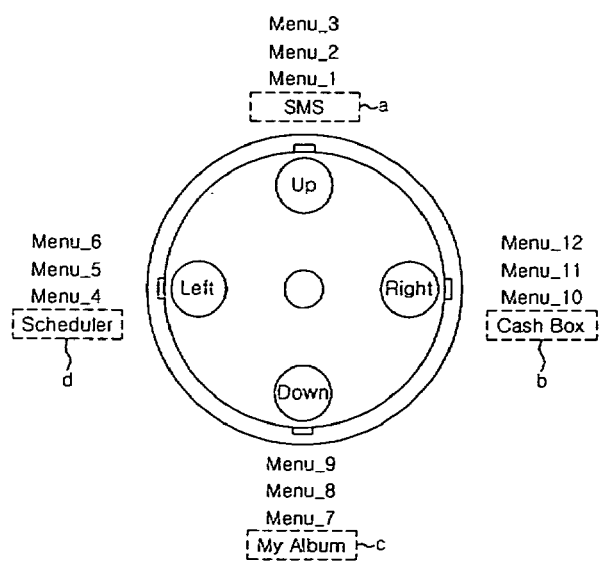
FIG. 5 is an overview illustrating a state where a rotary keypad is not rotated.

A method for executing a menu corresponding to a function key on the rotary keypad in a non-rotated state will now be described with reference to FIG. 5. As shown in FIG. 5, the function keys on the rotary keypad are direction keys (i.e., an up key, a down key, a left key and a right key). In this example, assume that when the keys are selected, the first key data of the up key is 0x00001, the first key data of the left key is 0x00011, the first key data of right key is 0x00100, and the first key data of the down key is 0x00101. Further, assume that the second key data (i.e., position data) for the keys in the non-rotated state is 0x00110 for the up key, 0x11001 for the left key, 0x 01100 for the right key, and 0x10011 for the right key. The first and second key data is then added or summed to determine what function to execute.

In addition, although this example illustrates the rotary dial being rotated in four possible positions (resulting in 4*4 possible hot keys), the dial may be rotated in any number of positions. For example, if the dial can be rotated in 12 positions, 4*12 hot keys can be set and used. The rotary dial may also include any number of function keys.

Thus, with reference to the non-rotated rotary keypad in FIG. 5, when the up key is selected, the control unit 120 retrieves the summed data (e.g., 0x00111) obtained by summing the first key data (0x00001) and the second key data (e.g., 0x00110) from the memory 110, and executes a relevant menu (e.g., SMS (a)) according to the detected execution information. Note that when the up key is not selected, only the position data (0x00110) of the up key is valid, and thus there is no execution information present in the memory 110. Therefore, a function is not inadvertently executed.

A similar summing concept applies to the left key, the right key, and the down key. That is, when the left key is selected, the control unit 120 detects execution information corresponding to the summed data obtained by summing the first and second key data of the left key and executes a relevant menu (e.g., Scheduler (d)) according to the detected execution information. When the right key is selected, the control unit 120 detects execution information corresponding to the summed data obtained by summing the first and second key data of the right key and executes a relevant menu (e.g., Cash Box (b)) according to the detected execution information.

Likewise, when the down key is selected, the control unit 120 detects execution information corresponding to the summed data obtained by summing the first and second key data of the down key and executes a relevant menu (e.g., My Album (c)) according to the detected execution information. In other words, the control unit 120 generates respective position data at predetermined positions (e.g., positions of respective function keys), detects relevant execution information according to the summed data obtained by summing the first and second data of a function key selected by the user, and executes a relevant menu.

Figure 6:
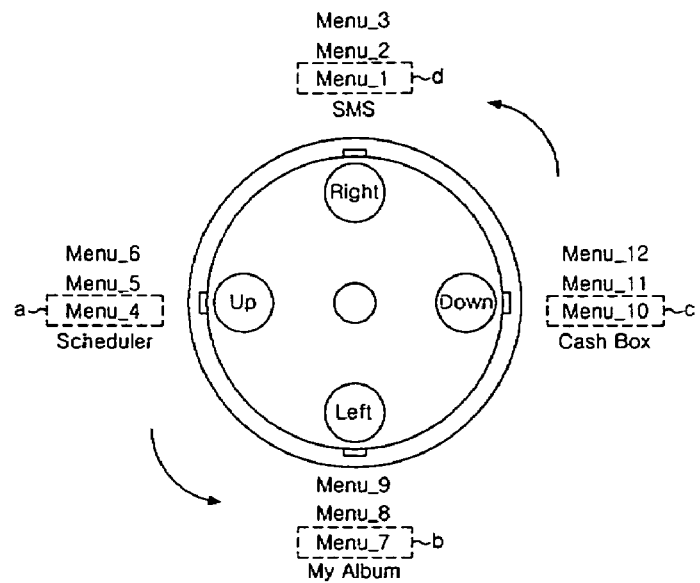
FIG. 6 is an overview illustrating a process of executing a relevant menu by selecting a function key in a state where the rotary keypad is rotated counterclockwise.

Turning now to FIG. 6, which is an overview illustrating a method for executing a menu corresponding to a function key on the rotary keypad that is rotated counterclockwise. In this example, when the keypad is rotated by one step counterclockwise from the reference state in FIG. 5 and the up key is then selected, the control unit 120 detects execution information corresponding to summed data (0x11010) obtained by summing the first key data (0x00001) and the second key data (i.e., position data) (0x11001) of the selected up key from the memory 110 and executes a relevant menu (e.g., Menu_4(a)) according to the detected execution information.

The same applies to the left key, the right key, and the down key. That is, in this example, when the left key is selected, the control unit 120 detects execution information corresponding to the summed data (0x10110) obtained by summing the first key data (0x0011) and the second key data (0x10011) of the left key and executes a relevant menu (e.g., Menu_7(b)) according to the detected execution information. Similarly, when the right key is selected, the control unit 120 detects execution information corresponding to the summed data (0x01010) obtained by summing the first key data (0x00100) and the second key data (0x00110) of the right key and executes a relevant menu (e.g., Menu_1(d)) according to the detected execution information. When the down key is selected, the control unit 120 detects execution information corresponding to the summed data (0x10001) obtained by summing the first key data (0x00101) and the second key data (0x01100) of the down key and executes a relevant menu (e.g., Menu_10(c)) according to the detected execution information.

Figure 7:
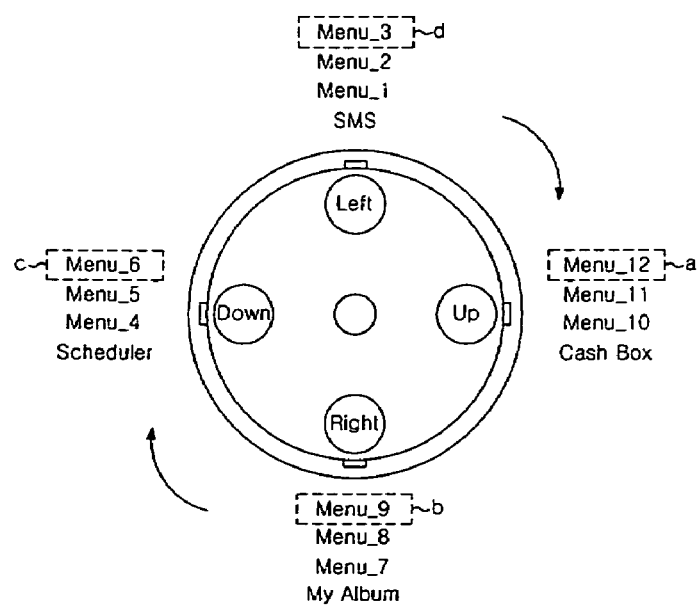
FIG. 7 is an overview illustrating a process of executing a relevant menu by selecting a function key in a state where the rotary keypad is rotated clockwise.

Next, a method for executing a menu corresponding to a function key on the rotary keypad that is rotated clockwise will be described with reference to FIG. 7. As shown, when the keypad is rotated by one step clockwise from the reference state in FIG. 5 and the up key is then selected, the control unit 120 detects execution information corresponding to the summed data (0x01101) obtained by summing the first key data (0x00001) and the second key data (0x01100) of the selected up key from the memory 110 and executes a relevant menu (e.g., Menu_12(a)) according to the detected execution information.

The same applies to the left key, the right key, and the down key. That is, when the keypad is rotated by one step clockwise from the reference state and the left key is then selected, the control unit 120 detects execution information corresponding to the summed data (0x01111) obtained by summing the first key data (0x00011) and the second key data (0x01100) of the left key and executes a relevant menu (e.g., Menu_3(d)) according to the detected execution information. Similarly, when the right key is selected, the control unit 120 detects execution information corresponding to the summed data (0x10111) obtained by summing the first key data (0x00100) and the second key data (0x10011) of the right key and executes a relevant menu (e.g., Menu_9(b)) according to the detected execution information.

Likewise, when the down key is selected, the control unit 120 detects execution information corresponding to the summed data (0x11110) obtained by summing the first key data (0x00101) and the second key data (0x11001) of the down key and executes a relevant menu (e.g., Menu_6(c)) according to the detected execution information. Thus, the mobile terminal of the present invention can quickly execute a relevant menu using the first and second key data of a function key selected at a rotated position in a state where the keypad has been rotated in any direction.

Figure 8A:
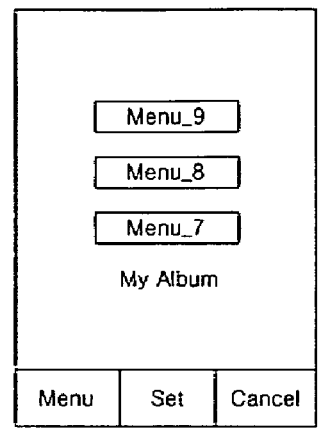
FIGS. 8a to 8d are overviews illustrating a process of setting shortcut function setting information of a function key.
Figure 8B:
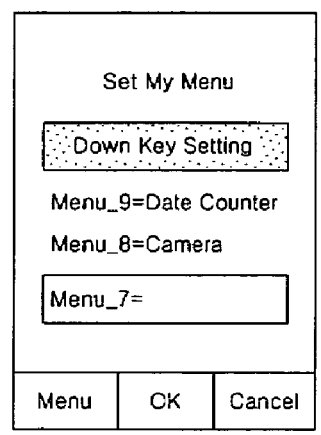

Turning next to FIGS. 8a-8d, which are overviews illustrating a method of setting execution information to be executed when a function key is selected. As shown in FIG. 8a, when the user requests the setting of a function key (e.g., the down key), the control unit 120 provides a confirmation window allowing the user to being setting a function for the down key. When the setting request is received through the provided confirmation window, the control unit 120 provides a setting window to enable the user to set the execution information of the down key, as shown in FIG. 8b.

Figure 8C:
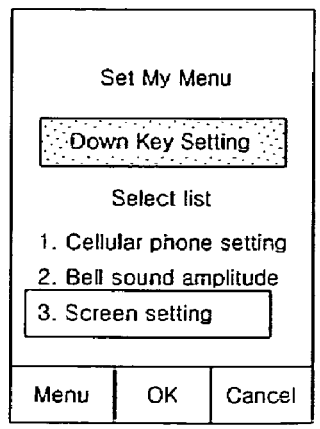

Then, if a set item (e.g., Menu_7) without execution information is selected on the setting window of FIG. 8b, the control unit 120 provides a list of execution information that has not been set, as shown in FIG. 8c. At this time, the remainder of set execution information except basically set shortcut function setting information is allowed to be changed through the setting window of FIG. 8b. When the user selects execution information (e.g., "3. Screen Setting") in the provided list, the control unit 120 stores the selected execution information in the memory 10.

Figure 8D:
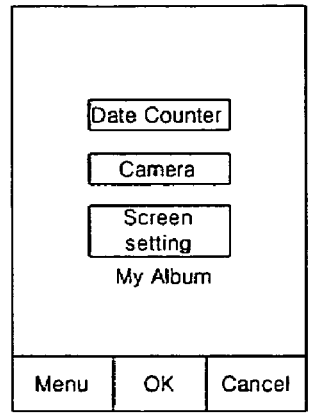

The set execution information is as shown in FIG. 8d. In this example, the screen setting menu is executed when the user rotates the keypad one step clockwise and then selects the right key. Alternatively, the screen setting menu can be executed by rotating the keypad three steps counterclockwise and selecting the right key. This is because the summed data is the same in the two cases.

Figure 9:
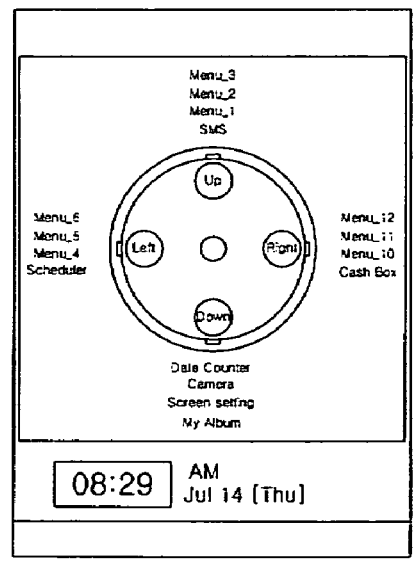
FIG. 9 is an overview of a screen showing functions assigned to different keys.

Turning next to FIG. 9, which is an overview illustrating execution information to be executed for each function key, which is set through the processes illustrated in FIGS. 8a to 8d. As shown in FIG. 9, the right key has been assigned the Cash Box function, the up key has been assigned the SMS function, the left key has been assigned the scheduler function, and the down key has been assigned the date counter, camera, screen setting and my album functions. Note that not all functions have been assigned to the right, up and left keys. Thus, the user is able to easily see what functions are assigned to each key and if there is any room left to assign another function to a key.

Figure 10:
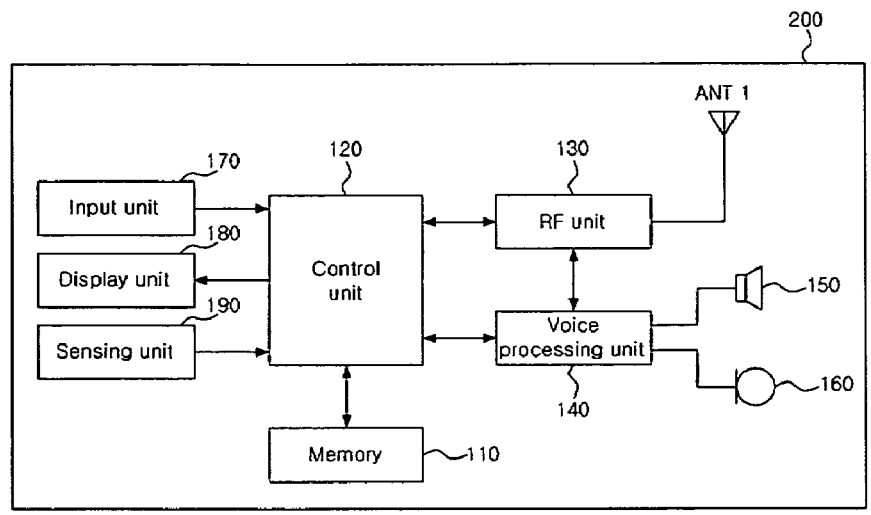
FIG. 10 is a block diagram illustrating a mobile terminal for executing a menu according to another embodiment of the present invention.

Next, FIG. 10 is a block diagram illustrating a mobile communication terminal 200 that performs a method for executing a menu according to another embodiment of the present invention. Note that FIG. 10 is similar to FIG. 1, but additionally includes a sensing unit 190. Thus, in describing this embodiment, details that overlap with the previous embodiment will be omitted. Further, components identical with or similar to those of the previous embodiment are designated by the same reference numerals.

In more detail, the sensing unit 190 senses a number of times a predetermined key has been selected on an idle screen. The control unit 120 then executes a relevant menu according to the sensed number of times and the corresponding key data of a function key input by the user. In addition, the memory 10 stores menus of function keys differently assigned according to the number of times a predetermined key is selected, and key data of each of the function keys for selecting a menu to be executed. Similar to the first embodiment, the function keys are direction keys that enable movement in four directions (up, down, left and right). However, other key arrangements may also be used.

Figure 15:
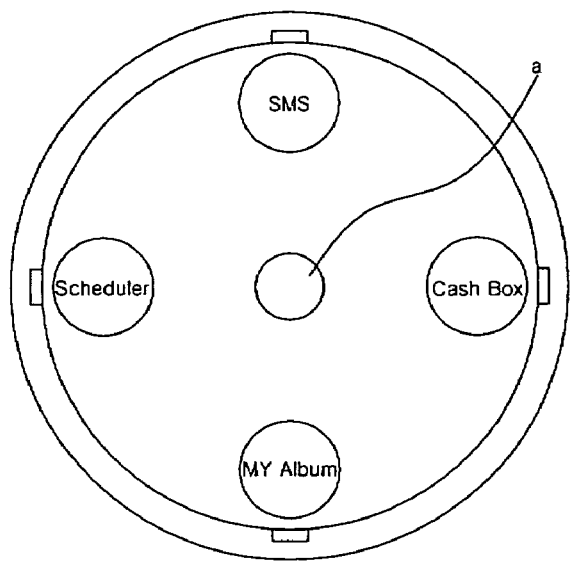
FIG. 15 is an overview illustrating an input unit on which execution information of respective function keys executed according to the number of times of selection is displayed.

The predetermined key may be a center key "a" located at the center of the four directional keys as shown in FIG. 15. Although the predetermined key is described as the center key, the predetermined key may be implemented using an additional button key. Thus, rather than rotating the dial, the predetermined key can be selected a number of times to execute a particular function associated with a selected direction key.

In more detail, the sensing unit 190 senses the number of times the center key is selected, and outputs the sensed results to the control unit 120. In particular, when one of the four direction keys is selected, the input unit 170 outputs key data of the selected key to the control unit 120. When a menu to be executed is selected in a touch manner among one or more menus displayed on the screen, the input unit 170 outputs key data for executing the selected menu to the control unit 120.

Further, the control unit 120 controls the general operations of the mobile terminal, displays menus of the respective function keys to be executed according to the number of times the center key is selected sensed by the sensing unit 190, and executes a menu corresponding to key data of a function key selected by the user among the displayed menus. Here, the key data indicates a direction key selected among the four direction keys.

Thus, in a state where menus of the function keys differently assigned according to the number of times the predetermined key is selected, and key data of each of the function keys for use in selecting a menu to be executed among the menus are stored in the memory 110, the control unit 120 displays predetermined menus of the function keys corresponding to the number of times the user selects the predetermined key, detects a menu corresponding to key data of a function key selected by the user among the displayed menus from the memory 110, and executes the detected menu.

Further, the control unit 120 also displays menus, which will be executed according to the number of times the user selects the predetermined key. Thus, it is possible to conveniently select and execute a desired menu by referring to the menus set in the function keys. The control unit 120 also displays the number of times the predetermined key is selected via an icon in a predetermined area. Accordingly, the user can recognize the number of times the predetermined key is selected and can easily recognize the predetermined menus of the function keys corresponding to the number of times of selection. In addition, the control unit 120 also displays pictures, texts, numerals, and a combination of texts and numerals, which indicate execution information of the function keys to be executed according to the number of times of selection, through a display device (not shown). Here, the display device includes an LED, for example.

Figure 11:
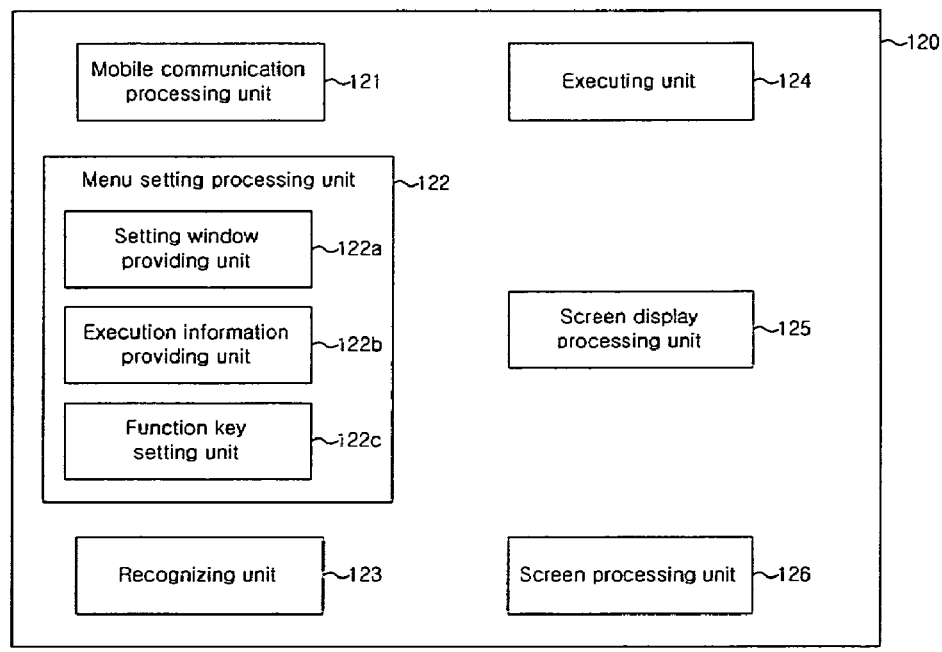
FIG. 11 is a block diagram illustrating a control unit of the mobile terminal shown in FIG. 10.

Turning next to FIG. 11, which is a block diagram of the control unit 120 shown in FIG. 10. Note the components in FIG. 11 are similar to the components shown in FIG. 2. Accordingly, only the functions of the components in FIG. 11 that are different than the functions of the components shown in FIG. 2 will be described. As shown in FIG. 11, the control unit 120 includes the mobile communication processing unit 121, the menu setting processing unit 122, the recognizing unit 123, the executing unit 124, the screen display processing unit 125, and additionally a display processing unit 126, which performs signal processing to perform mobile communication services. Because the mobile communication processing unit 121 and the menu setting processing unit 122 are identical with those of the previous embodiment, detailed descriptions thereof are omitted.

In addition, the recognizing unit 123 recognizes the number of times the predetermined key is selected, which is sensed by the sensing unit 190, and also recognizes key data of a function key input by the input unit 170. Further, the executing unit 124 detects from the memory 110 execution information corresponding to key data of a function key input and recognized by the input unit 170 among execution information of the function keys to be executed according to the number of times of selection recognized by the recognizing unit 123, and executes a relevant menu according to the detected execution information.

The screen display processing unit 125 displays the execution information of the function keys to be executed according to the number of times of selection recognized by the recognizing unit 123 on the screen. Also, the display processing unit 126 displays the execution information of the function keys to be executed according to the number of times of selection recognized by the recognizing unit 123 through a display device (e.g., LED). Thus, it is possible to quickly execute a relevant menu of a function key set by the user.

Figure 12:
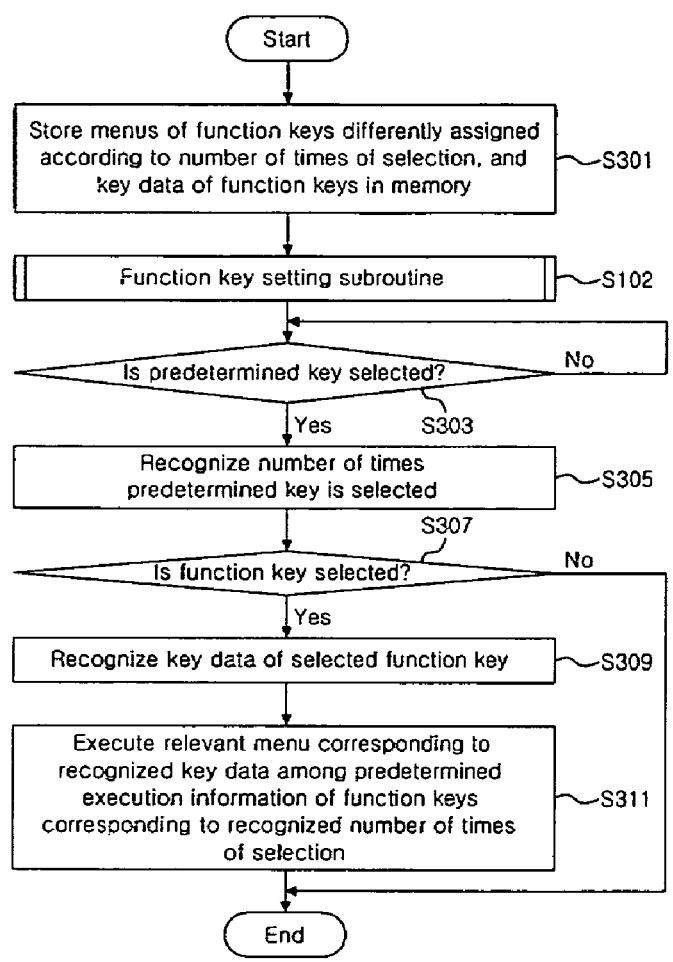
FIG. 12 is a flowchart illustrating a method for executing a menu in a mobile terminal according to another embodiment of the present invention.

Next, FIG. 12 is a flowchart illustrating a method for executing a menu in a mobile terminal according to another embodiment of the present invention. FIG. 11 will also be referred to in this description. As shown, the control unit 120 stores menus of function keys differently assigned according to the number of times a predetermined key is selected, and key data of each of the function keys for use in selecting a menu to be executed among the menus in the memory 110 (S301).

In addition, the menu setting processing unit 122 then performs a function key setting routine for setting at least execution information to execute any function key according to the number of times the predetermined is selected (S102 in FIG. 12). The function setting routine will again be described with reference to FIG. 4. As shown in FIG. 4, the menu setting processing unit 122 then determines whether a user requests to set execution information of a function key (S202), and if the user does not request execution information of a function key (No in S202), the process in the menu setting processing unit 122 moves to step S303 described below with respect to FIG. 12.

If the user requests execution information of a function key (Yes in S202), the setting window providing unit 122a provides a setting window for setting the execution information of the function key (S204). At this time, the provided setting window includes a setting part in which basic execution information set in the function key (e.g., once), and execution information to be executed according to the other number of times of selection (e.g., two times, three times, and four times) are to be set.

Then, the menu setting processing unit 122 determines whether the user requests a setting information preview (S206), and if the user does not request the setting information preview (No is S206), the menu setting processing unit 122 remains in an idle state for a predetermined period of time. Otherwise, if the user requests the setting information preview (Yes in S206), the execution information providing unit 122b provides a list of execution information that has not been set in the function keys (S208). The menu setting processing unit 122 then determines whether the user selects execution information from the provided list (S210).

If the user does not select execution information (No in S210), the menu setting processing unit 122 remains in an idle state for a predetermined time. Otherwise, if the user selects execution information (Yes in S210), the function key setting unit 122c sets the selected execution information as execution information of a relevant function key, and stores the set execution information in the memory 110. At this time, the function key setting unit 122c stores the number of times of selection and the key data required for executing the selected execution information in the memory 110 such that they correspond to the selected execution information.

Returning again to FIG. 12, the recognizing unit 123 determines whether the user selects the predetermined key (e.g., a center key such as a in FIG. 15), using the sensing unit 190 (S303). If the user does not select the predetermined key (No in S303), the recognizing unit 123 remains in an idle state for a predetermined period of time. Otherwise, if the user selects the predetermined key (Yes in S305), the recognizing unit 123 recognizes the number of times the user selects the predetermined key (S305). The recognizing unit 123 then determines whether any function key (e.g., one of the four direction keys) is selected (S307).

If a function key is not selected (No in S307), the recognizing unit 123 remains an idle state for a predetermined period of time and then terminates the process. Otherwise, if a function key is selected (Yes in S307), the recognizing unit 123 recognizes key data of the selected function key (S309). The executing unit 124 then executes a relevant menu according to execution information corresponding to the recognized key data of the function key among predetermined execution information of the function keys which corresponds to the recognized number of times of selection (S311).

Figure 13:
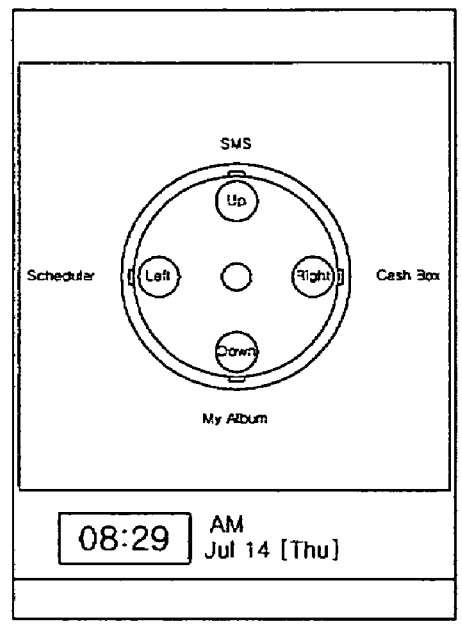
FIG. 13 is an overview illustrating execution information for respective function keys executed according to the number of times of the keys are selected.
Figure 14:
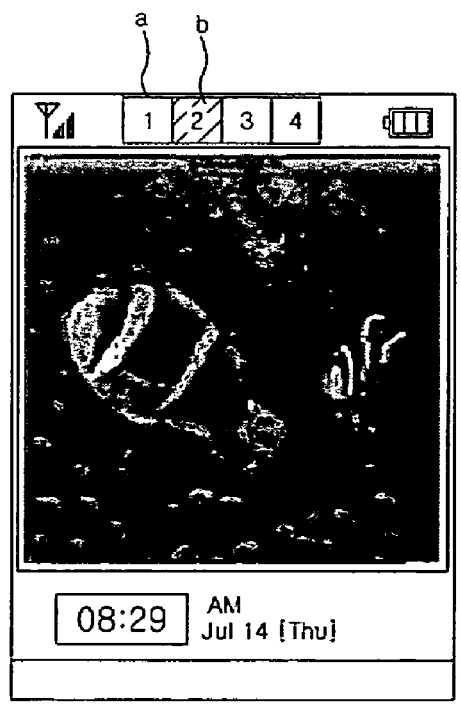
FIG. 14 is an overview illustrating icons displaying how many times a key is selected.

Further, as shown in FIG. 13, the control unit 120 displays predetermined menus of the function keys corresponding to the recognized number of times of selection on the screen. Thus, it is possible to execute a menu of a function key to be executed by selecting a menu in a touch manner from the displayed menus. In addition, as shown in FIG. 14, the control unit 120 also displays the number of times the predetermined key is selected as an icon in the prescribed area a, and executes a relevant menu according to selection of a function key among the menus of the respective function keys corresponding to an icon on which a cursor b is located. Accordingly, the user can easily recognize the number of times of selection, and select a function key for executing a desired menu while moving the cursor over the icons.

The control unit 120 also displays shortcut information indicating predetermined menus of the function keys corresponding to the recognized number of times of selection on the input unit 170 through a display device (e.g., LED), as shown in FIG. 15. Thus, it is possible to conveniently execute a desired menu while viewing the shortcut information displayed on the input unit. Although the predetermined key is described as a center key (a of FIG. 15) located at the center of the four direction keys in this embodiment, the present invention is not limited thereto but the predetermined key may be implemented by an additional button key.

Figure 16:
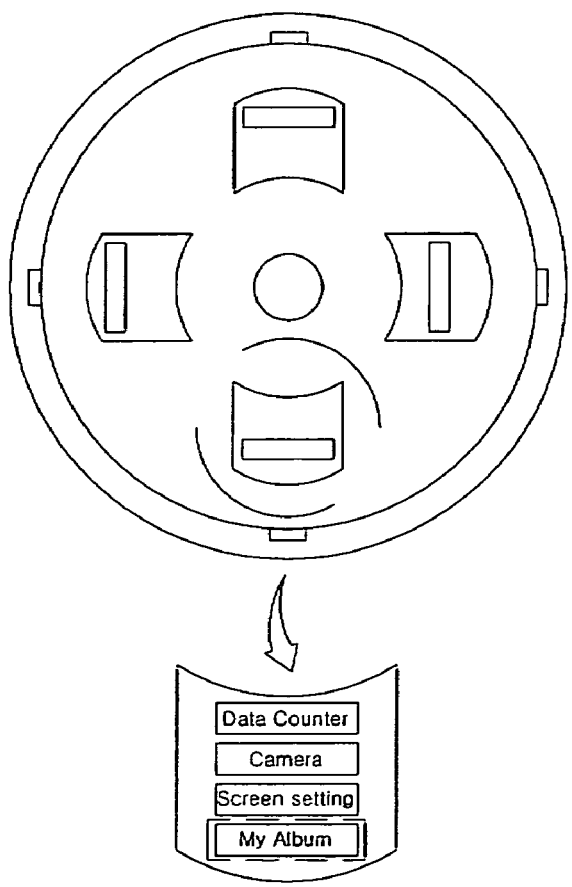
FIG. 16 is an overview illustrating an input unit on which predetermined execution information in each of the function keys is displayed.

Further, as shown in FIG. 16, the control unit 120 may display shortcut information indicating the menus differently assigned to the respective function keys on the surface of the input unit 170. Thus, the user can easily confirm the menus that are differently assigned to the respective function keys. By doing so, the user can conveniently execute a relevant menu of the set function key while directly viewing the menu.

According to the present invention described above, it is possible to quickly execute a desired menu by conveniently setting the menu in a hot key in addition to predetermined hot keys. Further, the user is also able to easily execute a desired menu while rotating a rotary keypad clockwise or counterclockwise. Moreover, execution information set in each function key is set. Thus, the user does not have to memorize the set execution information of each function key and can conveniently execute a relevant menu while confirming the execution information. Furthermore, the user can conveniently select a desired menu because execution information of each function key to be executed according to the number of times a predetermined key is selected is displayed on a screen and/or an input unit. In addition, the user can easily recognize the number of times a predetermined key is selected because the number of times of selection is displayed as an icon in a predetermined area.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A method for executing a menu in a mobile communication terminal, said method comprising:
identifying, via a controller on the mobile terminal, a first key and at least a second key among a plurality of keys, wherein the plurality of keys are moveable from a first location to at least a second location that is different than the first location;
identifying, via the controller, the first key is at the first location and the second key is at the second location; and
assigning, via a menu setting process, at least a first menu function to the first key based on a combination of the identified first key and the first location of the first key, and assigning at least a second menu function to the second key based on a combination of the identified second key and the second location of the second key,
wherein when the first key is moved to the second position and the second key is moved to a third position, the method further comprises assigning a third menu function to the first key at the second location based on a combination of the first key being at the second location, and assigning a fourth menu function to the second key at the third location based on a combination of the second key being at the third location.

2. The method of claim 1, wherein the plurality of keys are provided on a rotary keypad of the terminal.

3. The method of claim 1, further comprising:
displaying an identification of the menu functions to be executed next to the first and second keys.

4. The method of claim 1, further comprising:
displaying a function key setup menu which includes the plurality of keys;
selecting a key from the displayed plurality of function keys; and
assigning a menu function to the selected key using the function key setup menu.

5. The method of claim 4, further comprising:
displaying a preview menu including all functions that have been assigned to the plurality of keys.

6. The method of claim 1, further comprising:
assigning first key data to the first key and assigning second key data to the first location;
combining the first and second key data to obtain a resultant value; and
executing the first menu function based on the resultant value.

7. The method of claim 6, wherein the combining step comprises performing a Boolean operation on the first and second key data to obtain the resultant value.

8. A mobile communication terminal, comprising:
a control unit configured to identify a first key and at least a second key among a plurality of keys, wherein the plurality of keys are moveable from a first location to at least a second location that is different than the first location, and to identify the first key is at the first location and the second key is at the second location; and
a menu setting processing unit configured to assign at least a first menu function to the first key based on a combination of the identified first key and the first location of the first key, and to assign at least a second menu function to the second key based on a combination of the identified second key and the second location of the second key,
wherein when the first key is moved to the second position and the second key is moved to a third position, the menu setting processing unit is further configured to assign a third menu function to the first key at the second location based on a combination of the first key being at the second location, and to assign a fourth menu function to the second key at the third location based on a combination of the second key being at the third location.

9. The terminal of claim 8, further comprising:
a rotary keypad having the plurality of keys.

10. The terminal of claim 8, further comprising:
a displaying unit configured to display an identification of the first and second menu functions to be executed next to the first and second keys.

11. The terminal of claim 8, further comprising:
a displaying unit configured to display a function key setup menu which includes the plurality of keys,
wherein the control unit assigns a menu function to a selected key using the function key setup menu.

12. The terminal of claim 11, wherein the displaying unit further displays a preview menu including all functions that have been assigned to the plurality of keys.

13. The terminal of claim 10, further comprising:
an executing unit configured to combine first and second key data to obtain a resultant value and to execute the first or second menu functions based on the resultant value,
wherein the first key data is assigned to the first key and the second key data is assigned to the first location.

14. The terminal of claim 13, wherein the executing unit performs a Boolean operation on the first and second key data to obtain the resultant value.

15. A method for executing a menu in a mobile communication terminal, said method comprising:
identifying, via a controller on the mobile terminal, a first key and at least a second key among a plurality of keys;
identifying, via the controller, a number of times a selection key has been selected; and
assigning, via a menu setting processing unit on the mobile terminal, a first menu function and at least a second menu function to the first key based on a combination of the identified first key and the number of times the selection key has been selected, and assigning a third menu function and at least a fourth menu function to the second key based on a combination of the identified second key and the number of times the selection key has been selected.

16. The method of claim 15, wherein identifying the first key comprises assigning first key data to the first key, identifying the number of times the selection key has been selected comprises assigning second key data identifying the number of times the selection key has been selected, and assigning the first and second menu functions comprises assigning the first and second menu functions to the first key based on a combination of the first and second key data.

17. The method of claim 15, further comprising:
displaying an identification of the first and second menu functions to be executed next to the first key.

18. The method of claim 15, further comprising:
displaying a function key setup menu which includes the plurality of keys;
selecting a key from the displayed plurality of function keys; and
assigning a menu function to the selected key using the function key setup menu.

19. The method of claim 16, further comprising:
combining the first and second key data to obtain a resultant value; and
executing the first or second menu functions based on the resultant value.

20. The method of claim 19, wherein the combining step comprises performing a Boolean operation on the first and second key data to obtain the resultant value.

21. A mobile communication terminal, comprising:
a control unit configured to identify a first key and at least a second key among a plurality of keys, and to identify a number of times a selection key has been selected; and
a menu setting processing unit configured to assign a first menu function and at least a second menu function to the first key based on a combination of the identification and the number of times the selection key has been selected, and to assign a third menu function and at least a fourth menu function to the second key based on a combination of the identified second key and the number of times the selection key has been selected.

22. The terminal of claim 21, wherein the control unit assigns first key data to identify the first key, assigns second key data to identify the number of times the selection key has been selected, and the menu setting processing unit assigns the first and second menu functions to the first key based on a combination of the first and second key data.

23. The terminal of claim 21, further comprising:
a displaying unit configured to display an identification of the first and second menu functions to be executed next to the first key.

24. The terminal of claim 21, further comprising:
a displaying unit configured to display a function key setup menu which includes the plurality of keys,
wherein the control unit assigns a menu function to a selected key using the function key setup menu.

25. The terminal of claim 21, further comprising:
an executing unit configured to combine the first and second key data to obtain a resultant value and to execute the first or second menu functions based on the resultant value.

26. The terminal of claim 25, wherein the executing unit performs a Boolean operation on the first and second key data to obtain the resultant value.

* * * * *